United States Patent
Flippo et al.

(10) Patent No.: US 6,527,828 B2
(45) Date of Patent: Mar. 4, 2003

(54) OXYGEN ENHANCED CDA MODIFICATION TO A CDO INTEGRATED SCRUBBER

(75) Inventors: Belynda G. Flippo, Soquel, CA (US); Keith Karrup, San Francisco, CA (US); Robbert Vermeulen, Pleasant Hill, CA (US); Daniel O. Clark, Pleasanton, CA (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/811,716

(22) Filed: Mar. 19, 2001

(65) Prior Publication Data

US 2002/0170429 A1 Nov. 21, 2002

(51) Int. Cl.[7] .............................................. B01D 50/00
(52) U.S. Cl. .................. 95/54; 95/92; 95/130; 95/138; 96/4; 96/108; 96/134; 96/143; 96/243; 422/173; 422/176; 422/182; 422/183
(58) Field of Search .......................... 95/54, 138, 130, 95/92; 96/4, 108, 143, 134, 243, 267; 422/168, 171, 172, 173, 176, 177, 182, 183

(56) References Cited

U.S. PATENT DOCUMENTS

| | | | |
|---|---|---|---|
| 5,114,683 A | * | 5/1992 | Hirase |
| 5,280,664 A | | 1/1994 | Lin |
| 5,453,494 A | | 9/1995 | Kirlin et al. |
| 5,759,498 A | | 6/1998 | Sheu et al. |
| 5,800,792 A | * | 9/1998 | Ibraki et al. |
| 5,840,897 A | | 11/1998 | Kirlin et al. |
| 5,855,648 A | * | 1/1999 | Prasad et al. |
| 5,855,822 A | * | 1/1999 | Chen |
| 5,891,404 A | * | 4/1999 | Ibraki et al. |
| 5,972,078 A | * | 10/1999 | Collins et al. |
| 6,059,858 A | * | 5/2000 | Lin et al. |
| 6,110,529 A | | 8/2000 | Gardiner et al. |
| 6,153,150 A | * | 11/2000 | Moore et al. |
| 6,187,080 B1 | * | 2/2001 | Ping-Chung et al. |
| 6,217,640 B1 | * | 4/2001 | Lu et al. |
| 6,261,524 B1 | * | 7/2001 | Herman et al. |
| 6,261,525 B1 | | 7/2001 | Herman et al. |
| 6,361,584 B1 | * | 3/2002 | Stevens et al. |
| 2001/0032543 A1 | * | 10/2001 | Seeley et al. |
| 2001/0055555 A1 | * | 12/2001 | Herman et al. |

FOREIGN PATENT DOCUMENTS

EP 0933120 A1 8/1999

OTHER PUBLICATIONS

U.S. patent application Ser. No. 09/525,221, Inori, filed Mar. 15, 2000.

* cited by examiner

Primary Examiner—Duane S. Smith
(74) Attorney, Agent, or Firm—Steven J. Hultquist (57) ABSTRACT

A method and system for retrofitting an integrated scrubber to provide maximum oxygen content in a controlled decomposition oxidation (CDO) abatement process including a thermal/wet integrated scrubber, and a compressed air supply for supplying air to an oxygen separation device that separates the air into a nitrogen-enriched component and an oxygen-enriched component. The oxygen separation device includes a module, such as a vessel containing ceramic-materials arranged in an adsorbent bed or coated on a substrate. The present invention uses a ceramic oxide material through which only oxygen can diffuse. The composition of the ceramic oxide adsorbent material is such that a significant number of oxygen vacancies exist in the material. By placing either a voltage potential or a pressure gradient across the membrane, oxygen is selectively diffused in and through the oxide material to separate the air supply into an oxygen component for introduction into the integrated scrubber.

26 Claims, 4 Drawing Sheets

OXYGEN ENHANCED CDA MODIFICATION TO A CDO INTEGRATED SCRUBBER

BACKGROUND OF THE INVENTION

1. Field of the Invention

The present invention relates to the field of thermal/wet abatement of gaseous waste streams, and more particularly to a method and system for improving performance of new scrubbers and retrofitting existing integrated scrubbers to provide maximum oxygen content in a controlled decomposition oxidation abatement process.

2. Description of the Related Art

Semiconductor manufacturing processes utilize a variety of chemicals, many of which have extremely low human tolerance levels. Such materials include gaseous hydrides of antimony, arsenic, boron, germanium, nitrogen, phosphorous, silicon, selenium and other chemical elements. A significant problem has been the removal of these materials from effluent gas streams of semiconductor manufacturing processes. While virtually all U.S. semiconductor manufacturing facilities utilize scrubbers or similar means for treatment of their effluent gases, the technology is not capable of removing all toxic or otherwise unacceptable impurities.

One solution to this problem is to incinerate the process gas to oxidize the toxic materials, converting them to less toxic forms. Conventional incinerators, however, typically achieve less than complete combustion. The problem is compounded when the process stream to be treated is composed primarily of a nonflammable gas bearing the undesirable impurities.

A further limitation of conventional incinerators is their inability to mix sufficient fuel with a nonflammable process stream in order to render the resultant mixture flammable and completely combustible. The choice of fuel gas for mixing with a nonflammable process gas is also important from the perspective of maintaining low operating costs, and the incinerator design must reflect this choice of fuel if proper burning characteristics are to be achieved. For many gases the ability to achieve higher combustion temperatures will increase the destruction efficiency of the scrubbers. Additionally the use of a higher concentration of oxygen in the thermal section of the scrubber will allow the use of a mixture that has a lower fuel value, yet will still achieve the temperatures necessary for high performance.

However, many incinerators or combustion chambers currently used in existing facilities, depending on their age and construction, are not equipped with adequate piping systems for providing an additional source of flammable fuel gas. In such situations, several options are available. Retrofitting the existing combustion chamber with additional piping to provide a controlled incineration is one such option, but the cost of this retrofitting may be prohibitive. As another option, a combustible gas may be premixed with the gaseous effluent from the semiconductor process. However, this premixing can introduce a hazard potential if the combustible mixture is ignited by the incinerator flame and the ignition propagates a flame backwards into the pipe thereby creating a concomitant explosion potential. Flame arresters can be added to prevent such flashbacks but such devices tend to clog easily because of oxide particles that are typically present in such effluent gas/combustible gas mixtures.

Accordingly, it would be advantageous to provide an improved method and system to retrofit an existing thermal reactor unit for introduction of a low cost flammable gas, which retrofit is not cost-prohibitive to install on an existing unit, and which modification does not introduce an additional explosion potential in operation of the retrofitted thermal reactor unit.

SUMMARY OF THE INVENTION

The present invention relates to a method and system for providing controlled combustion of gaseous semiconductor wastes, whereby an inexpensive fuel is introduced to facilitate the conversion of nonflammable mixtures to flammable mixtures without a cost-prohibitive retrofit of the thermal/wet integrated abatement system.

In one aspect, the invention relates to a combustion chamber having increased ability to oxidize virtually all oxidizable components in a gaseous waste stream.

Another aspect relates to improved abatement capabilities of a combustion chamber by utilizing existing ducting and adapting same to introduce oxygen for controlled decomposition oxidation of a gaseous waste stream.

Thus, in accordance with one aspect of the present invention, there is provided a system for abating gaseous waste material, comprising:

a combustion chamber having at least one gas inlet communicatively connected to a source of compressed air; and an oxygen separation unit positioned therebetween.

Another embodiment of the present invention is directed to an abatement system for oxidative treatment of gaseous pollutants in a gas stream, the system comprising:

a thermal reactor and a gas conduit for conducting the gas stream into the thermal reactor, the gas conduit comprising at least one secondary inlet communicatively connected to a source of compressed dry air; and an oxygen separation unit positioned between the thermal reactor and the source of compressed dry air.

Preferably, the thermal reactor is provided with an inlet for introduction of the gas stream comprising a conduit terminating with a portion of the conduit within the reactor which projects into a tube defining an area in which there is flame formation. The conduit further comprises at least one secondary inlet for introduction of different gases such as nitrogen, oxygen and fuel.

The thermal reactor further comprises a central combustion chamber accommodating heating elements. The gases exiting the thermal reactor are passed through a liquid vortex that cools the exiting gases, which then are passed through a packed bed for trapping and condensing particles. A liquid scrubber also is provided for removing chemical pollutants. The scrubber may for example comprise at least two vertically separated beds containing coated packing.

A compressor is communicatively connected to the thermal reactor to supply a source of compressed air to the oxygen separation device positioned downstream of the compressor and upstream of the thermal reactor. The compressor is used to assist in pressurizing the air flow being delivered to the oxygen separation unit, or in a subatmospheric oxygen enrichment system, utilized to increase the pressure of the oxygen-enriched stream at a location downstream of the oxygen separation unit.

The oxygen separation unit of the present invention may comprise any device with selectivity for separating one major gaseous component from the other major components in the feed gas mixture. For example, a single membrane device or alternatively a several membrane device may be provided and operated to achieve a separation of the gaseous components in air. Typically, the membrane devices are manufactured in modules, each having certain semipermeable membrane areas for permeation. Semi-permeable membrane materials currently available which can be employed in this process include: polysulfone, cellulose acetate, polyimide, polyamide, silicone rubber, polyphenylene oxide, polycarbonate, tetra-bromo-bisphenol-A-polycarbonate, halogenated analogs of these polymers, ceramic materials, etc.

In the present application, hollow fibers formed from tetra-bromo-bisphenol-A-polycarbonate are used in a module to separate oxygen from compressed air, however other materials such as tetra-bromo-bisphenol-hexafluoro-polycarbonate can be used.

Alternatively, a ceramic material having a high selectivity for oxygen is utilized in the oxygen separation device to efficiently sorptively remove oxygen from an oxygen-containing feed gas mixture, to produce extremely high product gas purity. The ceramic material may be used as a filler material in a separation module or as a coated substrate, e.g., at least a portion of a membrane or fiber surface is coated with the oxygen-adsorbent ceramic material.

The ceramic material may comprise at least one material such as:

oxide fluorite oxygen ion conductors of the formula $A_4O_8$;

pyrochlore material of the formula $A_2B_2O_7$;

material of the formula $Bi_2O_3(A_2O_6)$;

stabilized forms of $d-Bi_2O_3$;

$Bi_{24}Pb_5Ca_3O_{44}$;

$Bi_{14}V_2O_{11}$;

perovskite materials of the formula $ABO_3$;

oxide Brown Millerite electrolytes of the formula $A_2B_2O_5$;

mixed Brown Millerite electrolytes of the formula $ABO_3ABO_{2.5}$;

$A_4O_6ABO_{2.5}$ compositions;

mixed superconducting $(ABO_3AO)$ electrolytes;

cryolite $(A_3BO_3)$ electrolytes;

columbite $(AB_2O_6)$ electrolytes;

and corresponding doped materials, wherein A and B are metals independently selected from the group consisting of lanthanum, aluminum, strontium, titanium, calcium, zirconium, iron, barium, indium, gadolinium, yttrium, copper, cerium, thorium, bismuth, cobalt, nickel, magnesium, manganese, vanadium, chromium, niobium, tantalum, boron, hafnium, neodymium, terbium, ytterbium, erbium, thullium, lutetium, samarium, lead, tin, lawrencium, and praseodymium.

A further aspect of the invention relates to a method of forming ceramic-coated fiber, wherein the ceramic is a metal oxide ceramic including at least one metal having a "high adsorptive capacity" at elevated temperatures, in which the method comprises the steps of:

(a) reacting nitric acid and ethylene glycol to yield glycolic acid;

(b) heating the glycolic acid to form oxalate ion;

(c) reacting the oxalate ion with the at least one metal to form a sol gel comprising corresponding metal oxalate(s);

(d) depositing the sol gel on a fiber substrate; and (e) calcining the sol gel on the fiber substrate to form a corresponding ceramic coating and yield the ceramic-coated fiber.

As used herein, the term "high adsorptive capacity" means an oxygen storage of at least 40 millimoles of oxygen per mole of the ceramic material when the ceramic material is contacted with oxygen gas at a temperature of 800° C.

As used herein, the term "elevated temperature" means a temperature in the range of from 500° C. to 1000° C.

When metal oxide ceramics are referred to herein in symbolic notational form without stoichiometric subscripts (e.g., in the term LaCaCoMO), it is to be understood that the respective elemental constituents are present in such material in stoichiometrically appropriate proportions relative to one another.

In another aspect, the invention relates to a method for generating oxygen-enriched air for subsequent introduction into an integrated scrubber system that comprises a combustion chamber for abatement of gaseous waste products from a semiconductor process. The method includes the steps of:

providing an oxygen and nitrogen separation system to effect separation of air into at least a nitrogen gas component and an oxygen gas component;

introducing compressed air into an inlet of the oxygen and nitrogen separation system;

withdrawing the nitrogen component from the oxygen and nitrogen separation system;

withdrawing the oxygen component from the oxygen and nitrogen separation system; and introducing the oxygen component into the combustion chamber for mixing with the gaseous waste products for abatement therein.

Yet another aspect of the present invention relates to a method for retrofitting an abatement system for processing a gaseous waste stream to introduce an oxygen or nitrogen enriched source therein, the method comprising:

providing an oxygen and/or nitrogen enriching device communicatively connected to an abatement chamber;

introducing compressed dry air to the oxygen and/or nitrogen enriching device wherein the compressed dry air is separated into an oxygen rich gaseous component and a nitrogen rich gaseous component; and directing and introducing the oxygen or nitrogen enriched gaseous component to the abatement chamber.

Other aspects, features and embodiments of the invention will be more fully apparent from the ensuing disclosure and appended claims.

DETAILED DESCRIPTION OF THE PREFERRED EMBODIMENT

Figure 1:
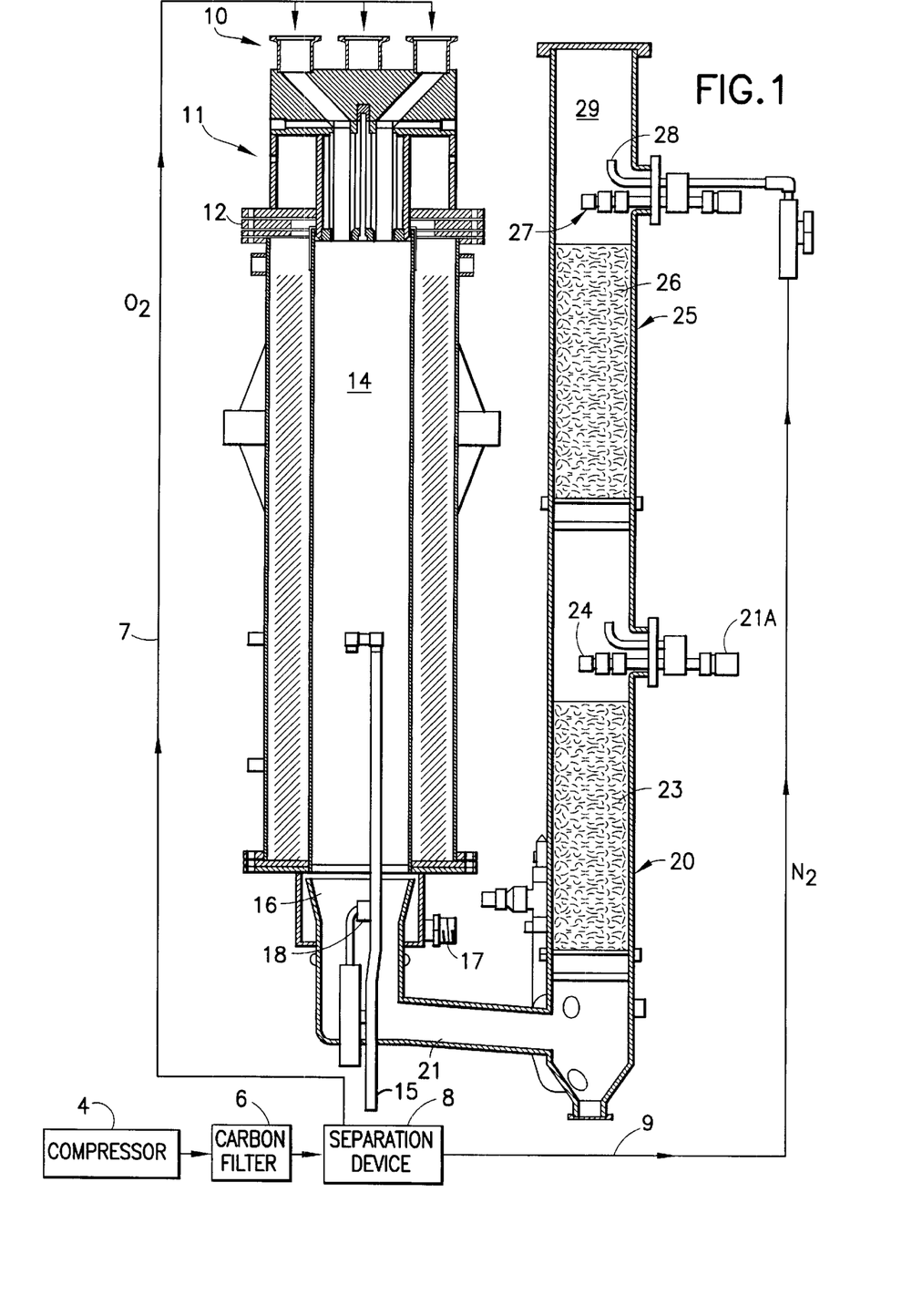
FIG. 1 is a schematic representation diagram of a retrofitted abatement system for controlled decomposition oxidation of a gaseous waste stream according to one embodiment of the invention.

Referring now to FIG. 1, the present invention provides a method and system for generating oxygen-enriched air for use in an abatement system for destroying gaseous waste products, comprising a thermal/wet integrated scrubber 11; and a compressed air supply 4 for supplying compressed air, that is optionally filtered 6, to an oxygen separation unit 8 that separates air into a nitrogen gas-enriched component 9 and an oxygen gas-enriched component 7.

The thermal/wet scrubbing integrated system 11 is shown, in diagram form, as a waste gas processing system wherein a waste gas from one or more semiconductor processing stations enters inlets 10, and is mixed with, if required, other gases. Typically, gas flow rates through such a waste processing system are less than about 300 standard liters per minute (slpm).

The waste gases are then treated in the thermal reactor or combustion chamber 14, to which air is optionally introduced through lines 12 and/or 15. The gases exiting the bottom of the thermal reactor 14 pass through a vortex 16 of liquid flowing through line 17 into the packed liquid scrubber 20.

The gases from the thermal reactor exit through conduit 21 and pass through a water spray and into a packed bed containing packing 23 through which the gases are flowed in counter-current and/or optionally co-current manner through the packing with and/or against the flow of water provided by continuous sprayer 24. Particle-containing liquid flows to the bottom to exit to a sump tank, and/or recirculation tank, and/or direct drain.

The gas is typically directed via ports 21A to a demister section 25 where moisture and additional particulate are removed via demister packing 26 and the cleaning of this section is accomplished with liquid provided by a continuous and/or intermittent sprayer 27. Air is injected through port 28 to provide direct cooling and promote reduction of the humidity of the exiting gas. The treated gas then exits through flue 29.

Figure 2:
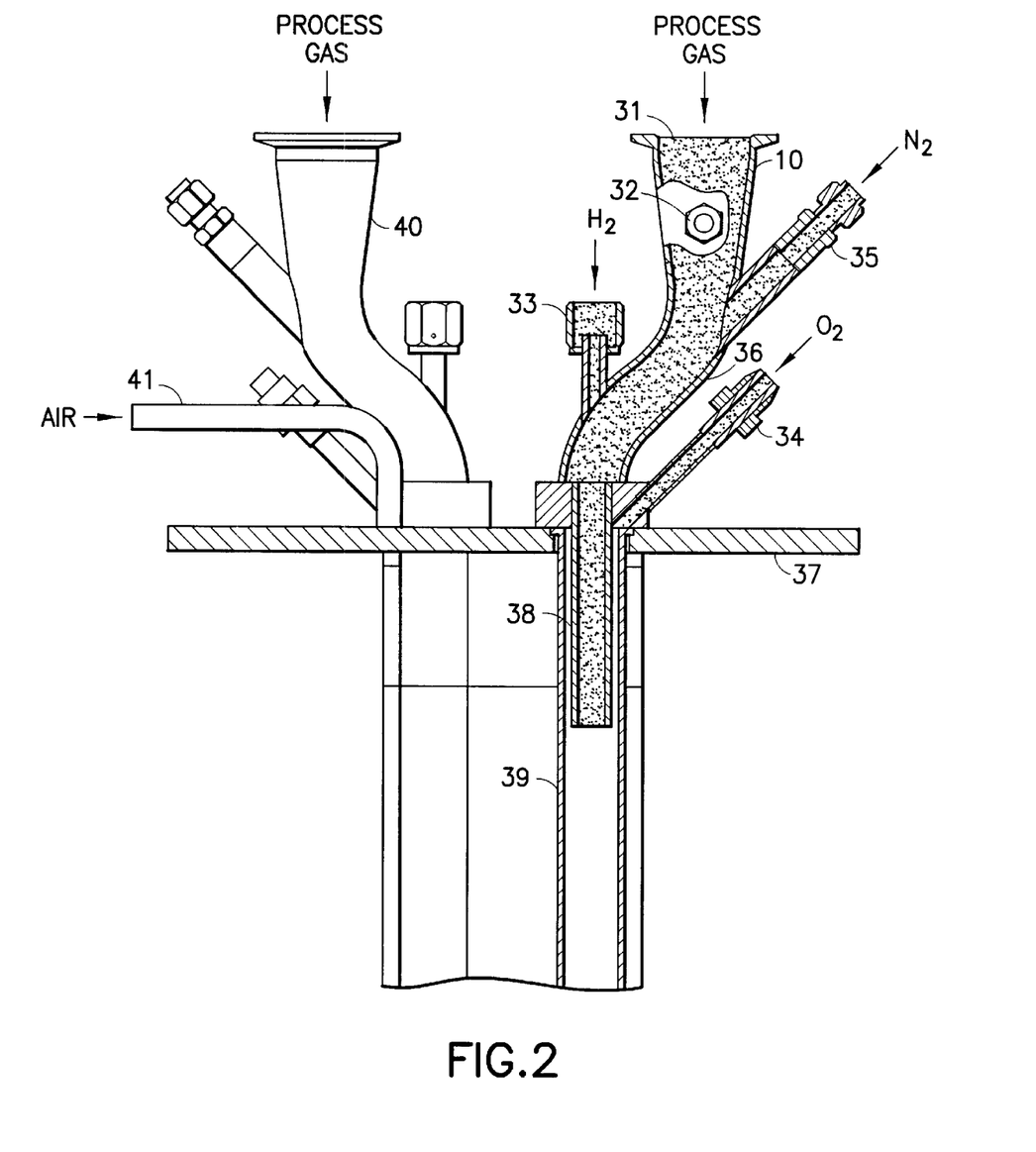
FIG. 2 is an illustration of one embodiment showing an inlet conduit for introduction of a gaseous waste stream into the abatement system of FIG. 1.

With reference to FIG. 2, there is shown inlet 10 into which is introduced the waste process gas 31. In this embodiment, there is an independent gas inlet 33 for the introduction of hydrogen, and gas inlet 34 for the introduction of oxygen, both of which are downstream of nitrogen inlet 35. A bend 36 in the inlet provides optimum mixing of the gases. However, the inlet need not have such a curvature and thus may have a straight configuration. The inlet tube continues pass the reactor wall 37, terminating with an extension 38 of the inlet tube. The mixed gases exit the extension 38, however not directly into the reactor volume, but instead into a concentric tube 39. The temperature of the mixture of gases and gas flow are selected such that the flame is produced entirely within the tube 39. A second inlet 41 adjacent to inlets 10 and 40 is shown for introducing air, and additional nitrogen and/or oxygen between the inlet tubes at the reactor chamber.

In operation the present invention comprises an air flow, which may either be at ambient or partially pressured conditions at a pressure ranging from about 50 to about 600 psig, and more preferably from about 60 to about 100 psig, that is delivered to the inlet of the compressor 4 and compressed to a sufficiently high state for continuous and efficient operation of the oxygen separation unit 8.

The oxygen separation unit 8 comprises a module, such as a vessel containing ceramic-materials in an adsorbent bed or coated on a substrate which may be constructed of any suitable material, such as a refractory metal. Alternatively, the vessel may be lined with an insulator material and heating elements may be incorporated on the inside of the vessel, to maintain the temperature of the bed at a suitable elevated temperature.

The present invention uses a ceramic oxide material through which only oxygen can diffuse. The composition of the ceramic oxide adsorbent material is such that a significant number of oxygen vacancies exist in the material. These oxygen vacancies facilitate the selective diffusion of oxygen through the material at relatively high rates. By placing either a voltage potential or a pressure gradient across the membrane, oxygen is selectively diffused in and through the oxide material.

For example, when placing a voltage potential across the membrane, a bed of ceramic-coated particles may be disposed in the containment vessel which contains a spaced-apart array of screen or grid electrode elements, containing ceramic adsorbent particles between the successive elements, and with the electrode elements alternatingly coupled to a voltage supply and ground, to provide a circuitry arrangement which can adsorb and then desorb the oxygen from an oxygen-containing gas.

The oxide compositions may be of any suitable type. These oxides preferably are characterized by 1) a high concentration of oxygen vacancies, 2) thermodynamic stability enabling operation at temperatures over 600° C., and 3) thermodynamic stability enabling operation under highly reducing conditions. Some oxides of such type are moisture-sensitive in character, but this is not problematic, since the adsorbent units may advantageously be run continuously at high temperature. Oxide compositions that exhibit vacancy ordering are less preferred due to their lower oxygen diffusivities. The following list sets forth some illustrative compositions that may advantageously be employed in the broad practice of the present invention:

$BaIn_{0.67}Zr_{0.33}O_y$ $BaIn_{0.67}Ce_{0.33}O_y$ $La_{0.5}Ba_{0.5}CO_{0.7}Cu_{0.3}O_y$ $La_{0.6}Sr_{0.4}Co_{0.8}Cu_{0.2}O_y$ $La_{0.8}Sr_{0.2}CoO_y$ $(Bi_2O_2)(NaNb_2O_{6.5})$ $Bi_2Sr_2Nb_2GaO_{11.5}$ $Bi_2Sr_2Nb_2AlO_{11.5}$ $ZrO_2—Y_2O_3—CeO_2$ $ZrO_2—Y_2O_3—Cr_2O_3$ $ZrO_2—Y_2O_3—MgO$ $Y_2O_3—CaO—CeO_2$ $ZrO_2—Y_2O_3$ $CeO_2—CaO—Y_2O_3$

Such materials may be readily synthesized within the skill of the art, using conventional ceramic synthesis procedures.

More specifically, the present invention in one aspect utilizes a ceramic ionic transport material as a pressure swing adsorbent (PSA) medium to trap and deliver oxygen. Rather than use electricity to drive the transport of oxygen, as in conventional ceramic membrane separation processes, the ionic transport ceramics alone can act as ionic oxygen storage media. The ceramic composition is deposited on a suitable substrate element, e.g., in a thin film, for such purpose.

The PSA system of the present invention operates on the principle that the ceramics used in the practice of the invention have the capacity to transport ionic oxygen. Molecular oxygen dissociates on the surface of the oxide ceramic and then is incorporated into the crystalline lattice. Potential gradients, for example in concentration, can cause the oxygen to move into and through the lattice. The imbalance in ions results in an electrical potential gradient across the material. In this manner, concentration and electrical gradients can be viewed as equivalent in terms of a driving force for oxygen transport. Thus, pressure (concentration) is used to drive ionic oxygen into the ceramic adsorbent articles.

In this manner, ionic transport materials are employed that are efficient "absorbents" with sole selectivity for oxygen. For example, by heating ceramic sorbent-coated particles and maintaining same at elevated temperature, oxygen will be removed from an air stream flowed through a bed of such particles. Then, by reducing the pressure, the oxygen-deficient air stream can be removed, and oxygen can subsequently be liberated from the ceramic to yield a pure oxygen source. By this absorbent arrangement, oxygen will be selectively and efficiently removed from the gas stream.

The present invention enables the bulk separation and purification of oxygen based on ionic transport, in which an adsorbent is maintained at high temperature to temporarily store oxygen, with oxygen that contacts the surface of the ceramic adsorbent decomposing on the surface and being incorporated into the crystalline lattice of the ceramic material. While such process requires high temperatures, e.g., on the order of 600–900° C., the higher separation efficiency of oxygen from other (inert) gases in the oxygen-containing feed gas mixture is unexpectedly superior to conventional PSA approaches.

When the oxygen gas contacts the ceramic adsorbent, there is adsorption and dissociation of the oxygen, with charge transfer acting to cause penetrative flux of the oxygen species into the sorbent material particle. The chemical potential driving force therefore is employed to effect ionic transport of the oxygen species into the sorbent material.

The ceramic oxide adsorbent particles may be constituted by an inert substrate that is coated or otherwise associated with an oxygen-permeable thin dense electrolyte film. Such electrolyte film may be formed of fast ionic conductors, e.g., formed of fluorite lattice structure materials, or of fast mixed conductors such as those having a perovskite lattice structure. The resultant material provides mixed oxygen ion and electronic conduction with a homogeneous microstructure. High ambipolar conductivity may be achieved by doping with an impurity that functions as a stabilizer and creates electronic and ionic defects in the lattice. The impurity species may be a donor dopant, which substitutes a higher valence cation by a lower valence cation to yield oxygen ion vacancies. Alternatively, the impurity species may be an acceptor dopant, whereby a host lattice cation is replaced by a higher transition valence cation that improves the electronic properties of the material while concurrently creating oxygen ion vacancies at low partial pressures of oxygen.

Such electrolytes may include oxide fluorite oxygen ion conductors ($A_4O_8$ wherein A is Zr, Ce, Hf, Th, etc.) may be employed in which anion vacancies have been introduced by Aliovalent doping, using dopant species such as $M_2O_3$ cations, such as wherein M is $Ca^{++}$, $Sr^{++}$, $Mg^{++}$, $Ba^{++}$, $Sc^{+++}$, $Yb^{+++}$, $Y^{+++}$, $Sm^{+++}$, $La^{+++}$ and $Gd^{+++}$.

The electrolyte may alternatively be a pyrochlore ($A_2B_2O_7$) material, in which A is Ni, Gd, Nd, etc., and B is Zr, Ti, Ce, Nb, etc., and dopant species such as $Y^{+++}$, $Mg^{++}$ and $Ca^{++}$. Other potentially useful electrolyte species include $Bi_2O_3(A_2O_6)$ based electrolytes, including dopant stabilized forms of $d-Bi_2O_3$ such as $Bi_{2-x-y}M'_xM_yO_{3-d}$, where x=0 to 0.6, y=0.2–0.4 and d=±0.3, M'=Er, Y, Tm, Yb, Tb, Lu, Nd, Sm, Py, Zr, Hf, Th, Ta, Nb, Pb, Sn, In, Ca, Sr, Lr and M=Co, Ni, Cu, Mn, Fe. Oxygen ion conductors such as $Bi_{24}Pb_5Ca_3O_{44}$ and $Bi_{14}V_2O_{11}$ may also be potentially useful in the practice of the invention.

Various perovskite materials may also be usefully employed in the practice of the invention. Examples include compositions of the formula $ABO_3$ where A=La, Sr, Ca, etc. and dopants (donor) of Ba, Sr, and with B=Al, Mn, Ti, Zr, Fe, Co, Gd, etc. and dopants (acceptor) such as Fe, Mg, Cu, Co. Illustrative perovskites include $(Mg,Fe)SiO_3$, $CaSiO_3$, $LaNiO_3$, and $LaAlO_3$. Other electrolytes include oxide Brown Millerite ($A_2B_2O_5$) electrolytes such as those in which A=Sr, Ba, Ca and B=Fe, In, Gd, Fe with dopants (acceptor) of Ti, Zr; mixed Brown Millerite electrolytes including $ABO_3ABO_{2.5}$ electrolytes such as those of the formula $La_{1-y}A_yB_{1-x}C_xMO_{3\pm x}$ wherein x=0 to 1, y=0.2 to 0.8, A=Ba, Ca, Sr, and B=Cr, Fe, Mn, Co and C=Fe, Ni, Cu and M=B, Cr, Fe, Mn, Co, specific examples of which include $La_{0.5}Ba_{0.5}FeO_{3-x}$ and $La_{0.33}Sr_{0.67}FeO_{3-x}$ wherein x=±0.3; $A_4O_6ABO_{2.5}$ compositions including BiMeVO electrolytes such as $Bi_2V_{1-x}M_xO_{5.5-d}$ wherein x is from 0 to 0.8 and d=±0.3, Aurivillius electrolytes of the formula $(Bi_2O_2)(A_{m-1}B_mO_{3(m+1)})$ where m is from 0 to 1, A=Ca, Sr, Ba, Pb, K and B=Fe, Cr, Ti, Nb, Ta; mixed superconducting ($ABO_3AO$) electrolytes such as $K_2NiF_4$, $(La_{1-y}Sr_y)_2CuO_{4-x}$ and $BaY_2Cu_3O_{7-x}$ electrolytes wherein x is from 0 to 1 and y is from 0.2 to 0.8, cryolite ($A_3BO_3$) electrolytes such as $Sr_2Nb_2O_{11}$ and $Ba_2Ta_2O_{11}$ electrolytes; and columbite ($AB_2O_6$) electrolytes such as $Ni(Nb_{1-x}M_x)_2O_{6-x}$ wherein x is from 0 to 1 and y is from 0.2 to 0.8.

Illustrative perovskite-type compounds include $LaAlO_3$, $LaMnO_3$, $SrTiO_3$, $CaZrO_3$, $Sr_2Fe_2O_5$, $Ba_2In_2O_5$, $Sr_2Gd_2O_5$, $Ca_3Fe_2TiO_8$, $Ba_3In_2ZrO_8$, $YBa_2Cu_3O_7$, $La_{2-x}Sr_xCuO_4$, $BaCe_{0.9}Gd_{0.1}O_{2.95}$, $BaTh_{0.9}Gd_{0.1}O_{2.95}$, etc.

Particularly preferred ceramic adsorbent materials in the practice of the invention include $Bi_2O_3$, $La_{1-y}Ca_yCo_{1-x}Fe_xO_{3-d}$ wherein d=0.1 to 0.5, y=0.2 to 0.6, x=0 to 0.8 (referred to acronymically as "LCCFO"), and its nickel analog LCCNO, containing Ni instead of Fe.

The ceramic adsorbent coated article of the present invention may be of any suitable size, shape and conformation appropriate to the end use application and the specific feed gas mixture involved in the oxygen adsorption use of the material. For example, the article may be in a finely divided form, e.g., beads, spheres, rings, toroidal shapes, irregular shapes, rods, cylinders, flakes, foils, films, cubes, polygonal geometric shapes, sheets, fibers, coils, helices, meshes, sintered porous masses, granules, pellets, tablets, powders, particulates, extrudates, cloth or web form materials, honeycomb matrix monolith, composites (of the ceramic adsorbent with other components), or comminuted or crushed forms of the foregoing conformations.

Various ionic transport electrolyte materials are identified in Table 1 below wherein surface exchange rates, diffusion coefficients, and most importantly, maximum storage capacities are set forth. As shown in the table, $La_{0.4}Ca_{0.4}Co_{0.8}Fe_{0.2}O_{3-\delta}$, with the highest surface exchange rate, has a theoretical storage capacity of 150 mmol $O_2$/mol at 800° C.

TABLE 1

Experimental reported values for K and D, and some modeling results

| Composition | Temp. (° C.) | Surface Ex. Rate K (m/s) | Diffusion Coeff., D (m²/s) | Max. Storage (mmol O₂/mol) | Vacancy % Filled in 100s |
|---|---|---|---|---|---|
| $Zr_{0.84}Y_{0.16}O_{2-d}$ -YSZ | 700 | $6 \times 10^{-11}$ | $2.5 \times 10^{-13}$ | 40 | 0.13 |
| YSZ - Bi Implanted | 700 | $1.6 \times 10^{-10}$ | $1.4 \times 10^{-12}$ | 40 | 0.15 |
| YSZ - Fe Implanted | 700 | $3.4 \times 10^{-10}$ | $3.3 \times 10^{-13}$ | 40 | 0.66 |
| $Bi_{1.55}Er_{0.45}O_{3-d}$ | 700 | $1 \times 10^{-7}$ | $4 \times 10^{-9}$ | 250 | 1.76 |
| $Bi_{1.5}Y_{0.5}O_{3-d}$ | 700 | $5 \times 10^{-9}$ | $9 \times 10^{-12}$ | 250 | 1.85 |
| $La_{0.6}Sr_{0.4}Co_{0.8}Ni_{0.2}O_{3-d}$ | 800 | $2 \times 10^{-8}$ | $1 \times 10^{-11}$ | 150 | 6.75 |
| $La_{0.6}Sr_{0.4}Co_{0.6}Ni_{0.4}O_{3-d}$ | 800 | $3 \times 10^{-8}$ | $6 \times 10^{-12}$ | 200 | 12 4 |
| $La_{0.6}Sr_{0.4}Co_{0.4}Ni_{0.6}O_{3-d}$ | 800 | $2 \times 10^{-8}$ | $7 \times 10^{-12}$ | 250 | 7.97 |
| $La_{0.6}Ca_{0.4}Co_{0.8}Fe_{0.2}O_{3-d}$ | 700 | $4 \times 10^{-8}$ | $2 \times 10^{-12}$ | 150 | 25.27 |
| $La_{0.6}Ca_{0.4}Co_{0.8}Fe_{0.2}O_{3-d}$ | 800 | $2 \times 10^{-7}$ | $1 \times 10^{-11}$ | 150 | 44.6 |
| $La_{0.6}Ca_{0.4}Co_{0.8}Fe_{0.2}O_{3-d}$ | 900 | $4 \times 10^{-7}$ | $3 \times 10^{-11}$ | 150 | 48.5 |

Increasing the oxygen vacancy in LaCaCoFeO compounds, through compositional modifications, was unsuccessful in improving their oxygen absorption capacity. Replacement of the Fe element with Ni was found, surprisingly, to enable the manipulation of composition and storage capacity.

Synthesis of LaCaCoNiO perovskite oxide materials may be carried out by a modified "Pechini" method, a liquid mixed technique, with ethylene glycol and nitrates used for the synthesis of LaCaCoNi oxide powders. A typical Pechini process involves the ability of certain weak acids (alphahydroxycarboxylic acid) to form polybasic acid chelates with various cations. These chelates can undergo polyesterification when heated in a polyhydroxyl alcohol to form a polymeric glass which has the cations uniformly distributed throughout the material.

Various cationic sources, such as carbonates, hydroxides, and alkoxides can also be used for the synthesis. Ethylene glycol reactions are similar to those of primary alcohols except for the presence of a hydroxyl group on each carbon. When cold nitric acid is added to the ethylene glycol, it oxidizes one of the alcohol groups giving glycolic acid. Heating the mixture yields oxalic acid, which is the simplest dibasic acid, comprising just two connected functional acidic carboxylic groups. Each carboxylic group loses a proton and forms oxalate ion. The oxalate ion $C_2O_4^{-2}$ functions as a bidentate chelate with a metal atom and forms a five-member chelate ring as shown below.

The majority of the elements in the Periodic Table form oxalate complexes. Because of the coordinating properties of the bidentate oxalate ion, most of the metals form complex oxalates in addition to simple oxalates. After the formation of these mixed cation gels, they are suitably calcined at elevated temperature, e.g., at 1080° C., to form crystalline oxide.

The ceramic adsorbent materials of the invention may be formed by metalorganic chemical vapor deposition (MOCVD) on suitable supports or substrates, using appropriate precursors for the respective metal components of the metal oxide ceramic materials. Usage of MOCVD is preferred as a result of the control of stoichiometry and uniformity of coverage that are thereby achievable. MOCVD permits films of multicomponent ceramics to be deposited with compositional reproducibility on the order of 0.1% and thickness uniformity of better than 5%.

Alternatively, the ceramic adsorbent material may be formed on the substrate element by conventional ceramic manufacturing techniques, such as powder metallurgy, slurry metallurgy (slip casting, tape casting, etc.) and coextrusion.

Another technique for forming the ceramic adsorbent article utilizes sol gel techniques, in which the ceramic material is deposited on a carrier or inert substrate, such as a porous silica, alumina, clays, glasses, or the like. Sol gel techniques may be employed to make up a sol of the ceramic precursor and to spray, dip-coat, soak, roller coat, or otherwise apply the solution to the substrate, following which the mixed cation gel can be subjected to high temperature, e.g., calcined, to produce the desired ceramic material.

In the use of MOCVD, the ceramic coating process may employ either neat liquids or liquid solutions (if solid precursors are used) in a single mixture containing all the components desired in the film. Such "liquid delivery" is an advantageous method of forming the ceramic adsorbent elements.

In forming films of the ceramic adsorbent material on substrate elements in the practice of the invention, individual precursors required for phase stability can be intimately mixed in a ratio that produces the desired film composition based on their respective deposition rates. Using liquid delivery the liquid sources are flash vaporized, thereby spending little time at the high temperature that leads to decomposition.

Precursor compositions are commercially available for the metal species of the ceramic adsorbent compositions of the invention, e.g., Zr, Y, Sr, Bi, Fe, La, Co, Ca precursors, which are provided in liquid form as precursors suitable for liquid delivery MOCVD. Liquid delivery precursors of such type are commercially available from Advanced Technology Materials, Inc. (Danbury, Conn.) under the trademark EPI-GRADE. Examples of such types of precursors include those disclosed in U.S. Pat. Nos. 5,453,494, 5,840,897, 5,820,664, and 6,110,529, the disclosures of which hereby are incorporated herein in their respective entireties.

Using the ceramic materials of the invention as absorbents in fixed bed PSA systems offers several advantages that currently hamper the development of such materials as membranes:

Reliability

Hot spots can develop in ceramic membranes as a result of exothermic recombination reactions on the surface of a nonuniform membrane. The hot spots then exhibit higher oxygen diffusion rates leading to runaway reactions and film failures. This problem can exist in newly manufactured membranes, and can develop in membranes exposed to many hours of use. By utilizing the ceramic adsorbent material in a PSA arrangement, pin-holes, film uniformity, thermal expansion mismatches, and sealing problems no longer are relevant.

Easy Scale Up and Development

The active ceramic material in the present invention is not employed as a structural operational element where its physical integrity is important for function. Structural applications for ceramics are notorious for scale-up problems. With a fixed bed, scale-up is straightforward and economical. The components of the PSA equipment are well known and their reliability is proven.

Large Surfaces Areas

By properly choosing the particle size and porosity, the surface area of the ceramic adsorbent in the bed of ceramic-coated articles can be adjusted to maximize mass transport for specified pressure swings and diffusion distances.

High Purity Inert and Oxygen Streams

Because the ceramic adsorbent material has perfect selectivity for oxygen, both high purity oxygen and inert streams can be produced. Conventional air separation PSA utilizes the differences in quadrapole moments between nitrogen and oxygen for separation, and since argon does not have a quadrapole moment it is not separated from oxygen. As a ceramic sorbent will only absorb oxygen, the inert components such as nitrogen and argon are left behind in the gas processed by contacting with the ceramic sorbent, and do not contaminate the product gas.

Rather than use an electric potential to drive ceramic material membranes, ceramic adsorbent articles of the present invention can utilize a concentration gradient to store oxygen. By having a pressure or concentration gradient over the ceramic coating, a concentration profile is developed within the film. In the presence of air at high temperature, oxygen will diffuse into the structure. Then by reducing the pressure or by using a vacuum, oxygen will diffuse from surface coating, thus providing a supply of pure oxygen.

A PSA process in the practice of the present invention may be carried out at any suitable pressure levels in the respective adsorption ("loading" of the ceramic adsorbent) and desorption (releasing of oxygen from the ceramic adsorbent), as may be readily be determined within the skill of the art and without undue experimentation. The adsorption pressure may by way of illustration entail a pressure level on the order of from about 1.2 to about 10 atmospheres, and the corresponding desorption pressure may be in the range of from about −0.2 atmosphere to about 0.8 atmosphere, at a temperature that is appropriate to the process, feed gas mixture and oxygen product characteristics.

The temperature maintained in the PSA process in one preferred aspect of the invention may be on the order of from about 500° C. to about 900° C. The adsorbent beds may be maintained in a heated condition by any suitable heating or thermal energy input means, such as for example electrical resistance heating elements disposed in the adsorbent bed, jacketing of the adsorbent vessels of the PSA system with a suitable heat exchange fluid being flowed through the jacket to maintain the vessel and adsorbent bed contained therein at a selected temperature. Other means include elements, assemblies and subassemblies for effecting radiant heating, ultrasonic heating, microwave heating, convective heating, conductive heating (e.g., via extended surface elements such as fins in the interior volume of the adsorbent bed, coupled in heated relationship with a thermal energy source), heat exchangers, etc.

The adsorbent beds in the PSA process system may be suitably sized for any appropriate output of oxygen for the given oxygen-containing feed gas mixture that is processed in the oxygen separation device, and the appertaining cycle time. For example, the system may be sized to produce 120 standard cubic feet per minute (SCFM) of oxygen at 99.95% purity from an oxygen-nitrogen mixture, during a 2 minute PSA cycle.

The PSA system of the invention may be advantageously employed to produce product gases such as oxygen, deoxygenated gases or gas mixtures (where the feed gas mixture undesirably contains oxygen), nitrogen (as the non-adsorbed gas from an oxygen-nitrogen mixture), etc. In one aspect, the PSA system of the invention may be employed to form "deoxo" gas, in which a 98% nitrogen stream containing oxygen is treated by the PSA process of the invention to yield a nitrogen gas product containing less than 100 parts per million by volume of oxygen.

The ceramic adsorbent material may be coated in a thin film by MOCVD on an inert substrate e.g., a particulate substrate, fibrous substrate, sheet or other substrate formed of a material such as active alumina, gamma alumina, tabular alumina or fused alumina. Alternatively, the coating of the substrate may be carried out by spray, sol gel, soak-and-bake, solution deposition, dipping, roller coating, or any other suitable technique. Such coated substrate bodies can be employed for pressure swing separation of oxygen-containing feed gas mixtures when such bodies are aggregated in a bed or mass with which the feed gas mixture is contacted at higher pressure, for subsequent release of the oxygen gas at lower pressure.

Figure 3:
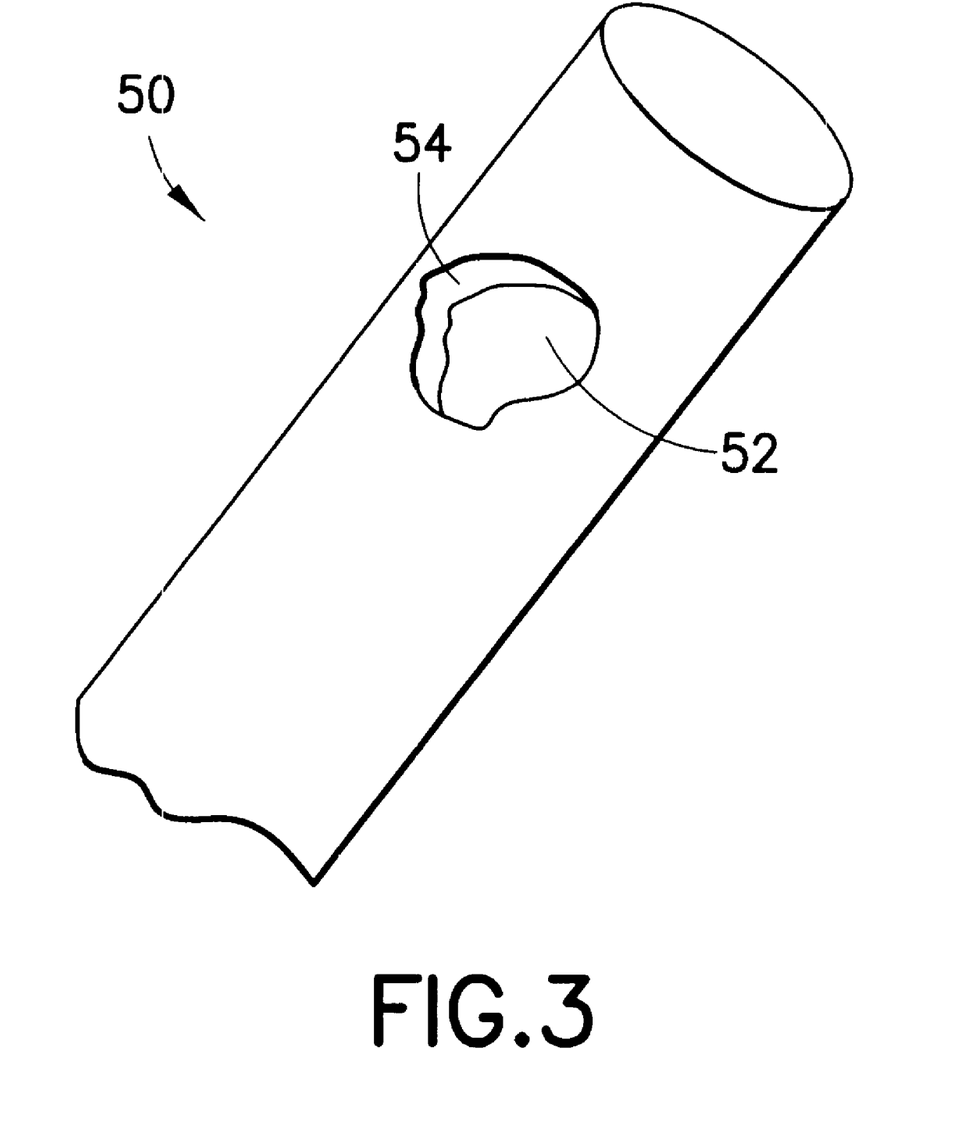
FIG. 3 is a perspective view of a coated fiber article including a fiber substrate coated with a ceramic adsorbent material according to one embodiment of the invention.

FIG. 3 is a perspective view of a coated fiber article 50 including a fiber substrate 52 coated with a ceramic adsorbent material 54 according to one embodiment of the invention. Coated fibers of such type may be employed in a bed of such fibers in a PSA process for extraction of oxygen from an oxygen-containing feed gas mixture. Alternatively, such fibers may be formed into woven or non-woven fibrous webs, that may likewise be employed in a PSA process for take-up of oxygen from an oxygen-containing feed gas mixture.

The fiber substrate 52 may be formed of a porous alumina material. The coating 54 may be a LCCFO material deposited on the fiber substrate at a thickness on the order of 0.1 micrometer. Such coated fiber article may be readily formed by liquid delivery MOCVD techniques using suitable precursors for the lanthanum, calcium, cobalt, and iron components of the LCCFO film. Alternatively, the coated fiber article may be formed by sol gel techniques, or in any other suitable manner.

The PSA system using ceramic adsorbent articles of the invention embodies a highly efficient means and method for the extraction of oxygen from an oxygen-containing feed gas mixture, by contacting such feed gas mixture with the ceramic sorbent coating material having sorptive affinity for oxygen at elevated temperatures, such as in the range of 500° C.–1000° C. The PSA system may be controlled by suitable cycle timer units, e.g., integrated with computer control, to provide appropriate continuous, semi-continuous or batch operation.

Figure 4:
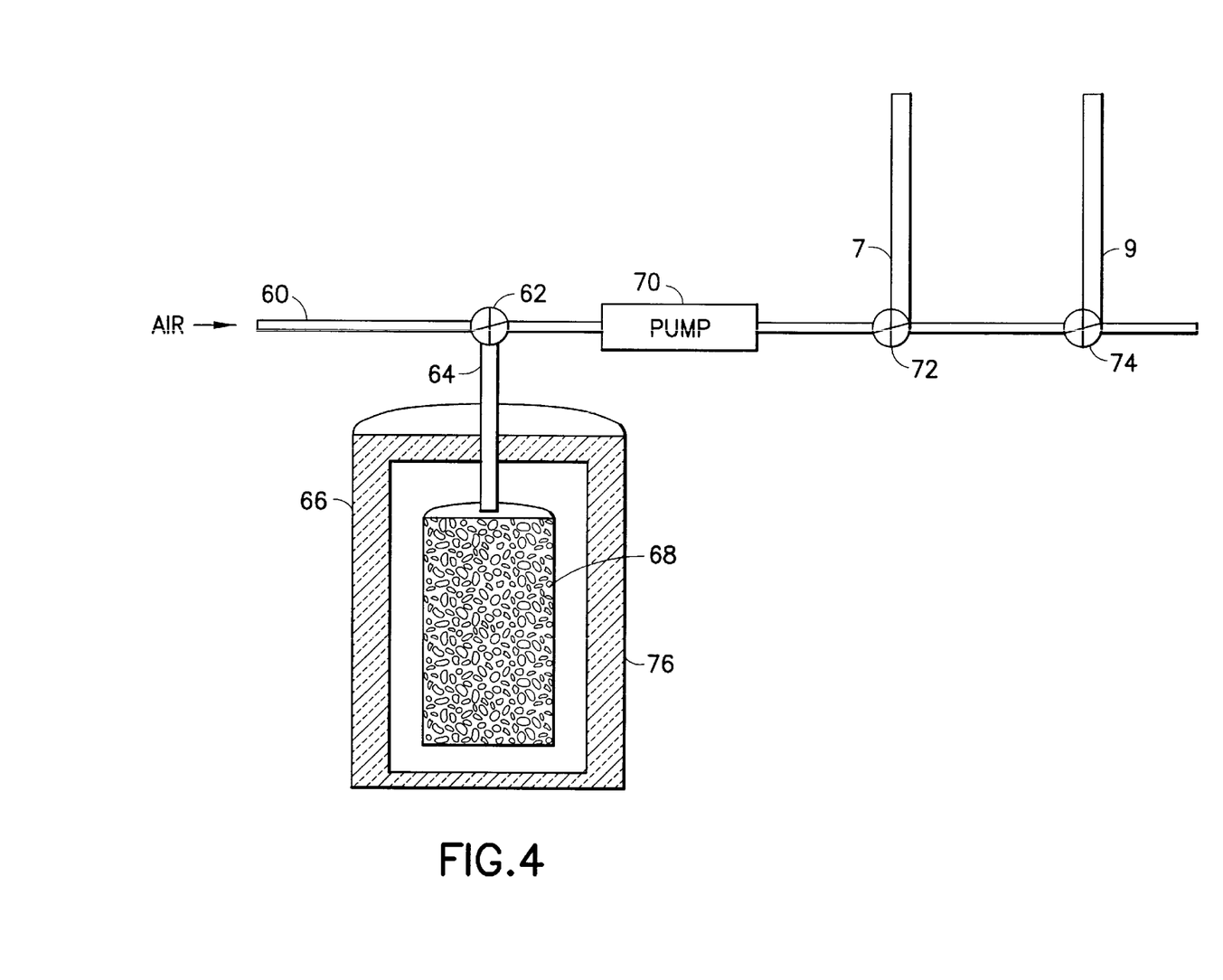
FIG. 4 is a schematic representation of pressure swing adsorption system using a ceramic adsorbent and utilized as an oxygen separation device, according to one embodiment of the present invention.

FIG. 4 shows a PSA module used as the oxygen separation device 8 in operation according to the present invention. Air or other oxygen-containing feed gas mixture from a compressor source 4 (shown in FIG. 1) is flowed through the main flow conduit 60 with the valve 62 directing the flow through feed and dispensing conduit 64 into vessel 66. During such charging the furnace 76 is actuated and maintains the ceramic adsorbent in a "hot" state appropriate to penetration of the oxygen into the sorbent articles of bed 68. When the bed has equilibrated, the interstitial void gas in the bed 68, comprising at least nitrogen, and essentially depleted in oxygen, is then pumped by pump 70 to line 9 as shown in FIG. 1, with valve 62 being switched to interconnect dispensing conduit 64 with the downstream portion of main flow conduit 60, valve 72 being closed to flow into the branch line 7, and valve 74 being open to flow of gas from the main flow conduit 60 into branch line 9.

The furnace 76 remains actuated, as valve 74 is closed to isolate the branch line 9, and valve 72 is opened to permit flow from the main flow conduit 60 to branch line 7. Pump 70 then acts to extract the oxygen gas from the vessel 66, as the ceramic adsorbent is maintained at a temperature allowing transport of the "trapped" oxygen from the sorbent bed articles into the voids of the bed. The oxygen gas may then be flowed from module 8 through conduit 7, into oxygen inlet 34 as shown in FIG. 1. In the alternative the oxygen may be flowed to air inlet 12 or 15, if the reactor does not have a designated oxygen inlet.

After the adsorbent bed in module 8 has been extracted of the oxygen, the feed gas mixture is again charged to the sorbent bed in the module as the furnace is maintained in operation to keep the adsorbent at suitable elevated temperature. Concurrently, a flow of non-adsorbed nitrogen gas may be directed through conduit 9 to port 28 thereinto, as the cycle is repeated.

In this manner, the system schematically shown in FIGS. 1 and 4 may be sequentially, repetitively and cyclically operated to effect separation of air or other oxygen-containing feed gas mixture into oxygen-depleted and oxygen fractions for recovery thereof as described.

It will be apparent that the system shown schematically in FIG. 1 is illustrative only, and that the invention may be practiced in other, multiple-bed arrangements, for continuous, semi-continuous, or batch operation, to separate the feed gas mixture involved. The heat flux may be maintained constant throughout the entire operation of the PSA process, or the temperature may be modulated during the process, as may be necessary or desirable in a given end use application of the present invention. For this purpose, the process system may employ suitable thermostatic, heat exchange or other temperature-controlling elements, such as thermo sensors, temperature controllers, microprocessors, mass flow controllers, etc.

The features and advantages of the invention are more fully shown with reference to the following non-limiting example, wherein all parts and percentages are by weight, unless otherwise expressly stated.

EXAMPLE I

A PSA system including an adsorbent bed containing LCCFO ceramic material is used as a separation device to produce oxygen at high purity for introduction into a thermal/wet abatement system.

Influent air stream has a mole fraction composition of oxygen, 20.9 mol. %, nitrogen, 78 mol. %, argon, 1.0 mol. % and carbon dioxide, 0.10 mol. %. This stream is at a temperature of 25° C. and a pressure of 50 psia. The temperature of the adsorbent bed is at 800° C.(alternatively, a value in the range of from about 600° C. to about 900° C. may be usefully employed). The feed air stream is heated in the heat exchanger upstream of the adsorbent bed to a temperature of 483° C. and is at a pressure of 100 psia. The compressor upstream from the heat exchanger provides heat for warming the feed stream and the adsorbent membrane means.

The influent air is passed to the adsorbent bed and oxygen is removed therefrom by the adsorbent in the bed, with the bed being heated by suitable means. In the depressurized state after active removal of oxygen from the air contacted with the adsorbent, the oxygen is pumped from the bed by a pump arranged downstream from the adsorbent bed and discharged from the system for introduction into the thermal reactor shown in FIG. 1.

The nitrogen-rich gas yielded by the adsorption of oxygen from the feed air mixture and discharged from the adsorbent bed is at a temperature of 800° C. and a pressure of 130 psia. After passage of the nitrogen-rich gas through the counter-current heat exchanger, the nitrogen-rich gas is discharged from the process system at a pressure of 50 psia and a temperature of 200° C.

The product nitrogen-rich gas contains 98.35 mol. % nitrogen, 0.27 mol. % oxygen, 1.26 mol. % argon, 0.13 mol. % carbon dioxide. The nitrogen-rich gas is discharge through line 9 and may be employed for reducing the dew point of emitting gases by introduction into port 28.

The oxygen-rich gas released from the adsorbent bed during the low-pressure step of the PSA process is at a pressure of 0.5 psia and a temperature of 800° C. The final oxygen-rich gas discharged from the downstream pump is at a pressure of 1 psia. The oxygen-rich gas contains 96.32 mol. % oxygen, 3.63 mol. % nitrogen, 0.05 mol % argon, and no carbon dioxide. The oxygen rich gas is pumped through line 7 to the thermal reactor.

EXAMPLE II

A ceramic adsorbent sol gel was employed to coat an alumina fiber mat using soak-and-bake or spray techniques. Usage of the solid fiber mat substrates offers several advantages, including reduction of pressure drop and maximum usage of the ceramic adsorbent medium. By coating the ceramic adsorbent medium on porous alumina substrates, an oxygen diffusion distance of 80 micrometers was achieved at 800° C.

EXAMPLE III

A hollow-fiber membrane system including hollow fibers formed from tetra-bromo-bisphenol A polycarbonate is used as a separation device to produce oxygen at high purity for introduction into a thermal/wet abatement system. This oxygen-rich stream is introduced at the top of the thermal section of the integrated scrubber to increase the combustion temperature and enhance the abatement efficiency.

EXAMPLE IV

A hollow-fiber membrane system including hollow fibers formed from tetra-bromo-bisphenol A polycarbonate is used as a separation device to produce oxygen at high purity for introduction into a thermal/wet abatement system. This oxygen-rich stream is introduced at the bottom of the thermal section of the integrated scrubber to create an oxidizing area at the bottom of the thermal section to oxidize any remaining oxidizable gases in the gas stream. This allows the upper part of the thermal section to be run with a lower than stoichiometric amount of oxygen to maintain a reducing atmosphere and reduce the formation of oxides of nitrogen.

What is claimed is:

1. An abatement system for pollutants in a gas stream comprising:
 a combustion chamber having at least one conduit for conducting the gas stream into the combustion chamber, the conduit communicatively connected to a source of compressed air; and an oxygen separation unit positioned therebetween to provide a source of oxygen enriched gas to the combustion chamber, wherein the oxygen separation unit comprises an oxygen separation material selected from the group consisting of a semi-permeable membrane material and an oxygen-adsorbent ceramic material.

2. The system according to claim 1 wherein the oxygen separation unit comprises a membrane device to separate $O_2$ from $N_2$ in the compressed air, for introduction into the combustion chamber.

3. The system according to claim 1 wherein the oxygen separation unit comprises an oxygen-adsorbent ceramic material having affinity for oxygen when the ceramic material is at elevated temperatures.

4. The system according to claim 3 wherein the ceramic material is selected from the group consisting of:

$Bi_{2-y}Er_yO_{3-d}$;
$Bi_{2-y}Y_yO_{3-d}$;
$La_{1-y}Ba_yCo_{1-x}Ni_xO_{3-d}$;
$La_{1-y}Sr_yCo_{1-x}Ni_xO_{3-d}$;
$La_{1-y}Ca_yCo_{1-x}Ni_xO_{3-d}$;
$La_{1-y}Ba_yCo_{1-x}Fe_xO_{3-d}$;
$La_{1-y}Sr_yCo_{1-x}Fe_xO_{3-d}$; and
$La_{1-y}Ca_yCo_{1-x}Fe_xO_{3-d}$;
wherein
x is from 0.2 to 0.8,
y is from 0 to 1.0 and
d=0.1 to 0.9.

5. The system according to claim 3 wherein the ceramic material is selected from the group consisting of:

oxide fluorite oxygen ion conductors of the formula $A_4O_8$;
pyrochlore material of the formula $A_2B_2O_7$;
material of the formula $Bi_2O_3(A_2O_6)$;
stabilized forms of d-$Bi_2O_3$;
$Bi_{24}Pb_5Ca_3O_{44}$;
$Bi_{14}V_2O_{11}$;
perovskite materials of the formula $ABO_3$;
oxide Brown Millerite electrolytes of the formula $A_2B_2O_5$;
mixed Brown Millerite electrolytes of the formula $ABO_3ABO_{2.5}$;
$A_4O_6ABO_{2.5}$ compositions;
mixed superconducting ($ABO_3AO$) electrolytes;
cryolite ($A_3BO_3$) electrolytes;
columbite ($AB_2O_6$) electrolytes;
and corresponding doped materials, wherein A and B are metals independently selected from the group consisting of lanthanum, aluminum, strontium, titanium, calcium, zirconium, iron, barium, indium, gadolinium, yttrium, copper, cerium, thorium, bismuth, cobalt, nickel, magnesium, manganese, vanadium, chromium, niobium, tantalum, boron, hafnium, neodymium, terbium, ytterbium, erbium, thullium, lutetium, samarium, lead, tin, lawrencium, and praseodymium.

6. The system according to claim 1 wherein the abatement system further comprises an inlet for introduction of the gas stream, the inlet comprising a conduit terminating with a portion of the conduit within the reactor which projects into a tube defining an area in which there is flame formation; and the conduit further comprises at least one secondary inlet for introducing at least the oxygen enriched gas.

7. The system according to claims 6 further comprising a central combustion chamber accommodating heating elements; a liquid vortex which cools gases passing from the combustion chamber; a packed bed for trapping and condensing particles from the gas stream after passing through the liquid vortex; and a liquid scrubber for removing chemical pollutants.

8. The system according to claim 1 wherein the oxygen separation unit comprises a polymeric membrane with a higher permeability for oxygen than for nitrogen.

9. An abatement system for oxidative treatment of gaseous pollutant in a gas stream, the system comprising:

a thermal reactor and a gas conduit for conducting gaseous stream into the thermal reactor, the gas conduit comprising a secondary inlet communicatively connected to a source of compressed dry air; and an oxygen separation unit positioned therebetween, wherein the oxygen separation unit comprises an oxygen-adsorbent ceramic material.

10. The system according to claim 9 wherein the source of compressed dry air is a compressor and the oxygen separation unit comprises a membrane means for continuously separating pressurized air into oxygen-enriched and oxygen-depleted streams; and the system further comprises a heat exchanger positioned between the compressor and the membrane means for transferring heat from the compressor to the membrane means.

11. The system according to claim 9, wherein the oxygen-adsorbent ceramic material selected from the group consisting of:

$BaIn_{0.67}Zr_{0.33}O_y$;
$BaIn_{0.67}Ce_{0.33}O_y$;
$La_{0.5}Ba_{0.5}Co_{0.7}Cu_{0.3}O_y$;
$La_{0.6}Sr_{0.4}CO_{0.8}Cu_{0.2}O_y$;
$La_{0.8}Sr_{0.2}CoO_y$;
$(Bi_2O_2)(NaNb_2O_{6.5})$;
$Bi_2Sr_2Nb_2GaO_{11.5}$;
$Bi_2Sr_2Nb_2AlO_{11.5}$;
$ZrO_2$—$Y_2O_3$—$CeO_2$;
$ZrO_2$—$Y_2O_3$—$Cr_2O_3$;
$ZrO_2$—$Y_2O_3$—$MgO$;
$Y_2O_3$—$CaO$—$CeO_2$;
$ZrO_2$—$Y_2O_3$; and
$CeO_2$—$CaO$—$Y_2O_3$.

12. The system according to claim 11 wherein the ceramic material is packed in an adsorbent bed.

13. The system according to claim 12 wherein the oxygen separation unit comprises a vessel lined with an insulator material and heating elements incorporated in the vessel to maintain the temperature of the bed at suitable elevated temperatures.

14. The system according to claim 13 wherein suitable elevated temperatures comprise temperatures in the range from about 600 to 900° C.

15. The system according to claim 11 wherein the ceramic material is deposited on an inert substrate as an oxygen-permeable thin film electrolyte thereon.

16. A method for retrofitting an abatement system for processing a gaseous waste stream to introduce an oxygen-enriched source therein, the method comprising:

providing an oxygen-enriching device communicatively connected to an abatement chamber, wherein the oxygen-enriching device comprises an oxygen separation material selected from the group consisting of a semi-permeable membrane material and an oxygen-adsorbent ceramic material;

introducing compressed dry air to the oxygen-enriching device wherein the compressed dry air is separated into an oxygen-rich gaseous component and a nitrogen-rich gaseous component; and introducing the oxygen-rich gaseous component to the abatement chamber.

17. The method according to claim 16 wherein the oxygen separation unit comprises a membrane device to separate $O_2$ from $N_2$ in the compressed air for introduction into the combustion chamber.

18. The method according to claim 16 wherein the oxygen separation unit comprises an oxygen-adsorbent ceramic material having affinity for oxygen when the ceramic material is at elevated temperatures.

19. The method according to claim 18 wherein the ceramic material is selected from the group consisting of:

$Bi_{2-y}Er_yO_{3-d}$;
$Bi_{2-y}Y_yO_{3-d}$;
$La_{1-y}Ba_yCo_{1-x}Ni_xO_{3-d}$;
$La_{1-y}Sr_yCo_{1-x}Ni_xO_{3-d}$;
$La_{1-y}Ca_yCo_{1-x}Ni_xO_{3-d}$;
$La_{1-y}Ba_yCo_{1-x}Fe_xO_{3-d}$;
$La_{1-y}Sr_yCo_{1-x}Fe_xO_{3-d}$; and
$La_{1-y}Ca_yCo_{1-x}Fe_xO_{3-d}$;

wherein
x is from 0.2 to 0.8,
y is from 0 to 1.0 and
d=0.1 to 0.9.

20. The method according to claim 18 wherein the ceramic material is selected from the group consisting of:

oxide fluorite oxygen ion conductors of the formula $A_4O_8$;
pyrochlore material of the formula $A_2B_2O_7$;
material of the formula $Bi_2O_3(A_2O_6)$;
stabilized forms of $d\text{-}Bi_2O_3$;
$Bi_{24}Pb_5Ca_3O_{44}$;
$Bi_{14}V_2O_{11}$;
perovskite materials of the formula $ABO_3$;
oxide Brown Millerite electrolytes of the formula $A_2B_2O_5$;
mixed Brown Millerite electrolytes of the formula $ABO_3ABO_{2.5}$;
$A_4O_6ABO_{2.5}$ compositions;
mixed superconducting ($ABO_3AO$) electrolytes;
cryolite ($A_3BO_3$) electrolytes;
columbite ($AB_2O_6$) electrolytes;
and corresponding doped materials, wherein A and B are metals independently selected from the group consisting of lanthanum, aluminum, strontium, titanium, calcium, zirconium, iron, barium, indium, gadolinium, yttrium, copper, cerium, thorium, bismuth, cobalt, nickel, magnesium, manganese, vanadium, chromium, niobium, tantalum, boron, hafnium, neodymium, terbium, ytterbium, erbium, thullium, lutetium, samarium, lead, tin, lawrencium, and praseodymium.

21. The method according to claim 16 wherein the abatement system further comprises an inlet for introduction of the gas stream, the inlet comprising a conduit terminating with a portion of the conduit within the reactor which projects into a tube defining an area in which there is flame formation; and the conduit further comprises at least one secondary inlet for introducing at least the oxygen-enriched gas.

22. The method according to claim 18 wherein the ceramic material is packed in an adsorbent bed.

23. The method according to claim 22 wherein the oxygen separation device comprises a vessel lined with an insulator material and heating elements incorporated on the inside of the vessel to maintain the temperature of the bed at selected elevated temperatures.

24. The method according to claim 23 wherein selected elevated temperatures comprise temperatures in the range from about 600 to 900° C.

25. The method according to claim 18 wherein the ceramic material is deposited on an inert substrate as an oxygen-permeable thin film electrolyte thereon.

26. A method for generating oxygen-enriched air for subsequent introduction into an integrated scrubber system which comprises a combustion chamber for abatement of gaseous waste products from a semiconductor process, the method comprising:

providing an oxygen separation system to effect the separation of air into a nitrogen gas component and an oxygen gas component, wherein the oxygen separation system comprises an oxygen separation material selected from the group consisting of a semi-permeable membrane material and an oxygen-adsorbent ceramic material;

introducing compressed air into an inlet of the oxygen separation system;

withdrawing the nitrogen component from the oxygen separation system;

withdrawing the oxygen component from the oxygen separation system; and introducing the oxygen component into the combustion chamber for mixing with the gaseous waste products for abatement of same therein.

* * * * *